US011067671B2

(12) United States Patent
Chong (10) Patent No.: US 11,067,671 B2
(45) Date of Patent: *Jul. 20, 2021

(54) LIDAR SENSING ARRANGEMENTS

(71) Applicant: SANTEC CORPORATION, Aichi (JP)

(72) Inventor: Changho Chong, Los Altos, CA (US)

(73) Assignee: SANTEC CORPORATION, Komaki (JP)

( * ) Notice: Subject to any disclaimer, the term of this patent is extended or adjusted under 35 U.S.C. 154(b) by 580 days.

This patent is subject to a terminal disclaimer.

(21) Appl. No.: 15/954,878

(22) Filed: Apr. 17, 2018

(65) Prior Publication Data

US 2019/0317194 A1 Oct. 17, 2019

(51) Int. Cl.
| | | |
|---|---|---|
| *G01C 3/08* | (2006.01) | |
| *G01S 7/481* | (2006.01) | |
| *G01S 7/4865* | (2020.01) | |
| *G01S 7/4861* | (2020.01) | |
| *G01S 17/42* | (2006.01) | |

(52) U.S. Cl.
CPC .......... *G01S 7/4817* (2013.01); *G01S 7/4861* (2013.01); *G01S 7/4865* (2013.01); *G01S 17/42* (2013.01)

(58) Field of Classification Search
CPC .... G01S 7/4911; G01S 7/4816; G01S 7/4817; G01S 7/4861; G01S 7/4865; G01S 7/4814; G01S 17/34; G01S 17/32; G01S 17/42
USPC ...................................................... 356/5.01
See application file for complete search history.

(56) References Cited

U.S. PATENT DOCUMENTS

| | | |
|---|---|---|
| 4,466,699 A | 8/1984 | Droessler et al. |
| 5,022,745 A | 6/1991 | Zayhowski et al. |
| 5,319,668 A | 6/1994 | Luecke |
| 5,372,135 A | 12/1994 | Mendelson et al. |
| 5,430,574 A | 7/1995 | Tehrani |
| 5,537,162 A | 7/1996 | Hellmuth et al. |
| 5,561,523 A | 10/1996 | Blomberg et al. |

(Continued)

FOREIGN PATENT DOCUMENTS

| | | |
|---|---|---|
| DE | 10 2011 114 797 A1 | 4/2013 |
| JP | 2006-202543 A | 8/2006 |

(Continued)

OTHER PUBLICATIONS

Aflatouni, et al., "Nanophotonic coherent imager," Optics Express 5118, vol. 23, No. 4, Feb. 23, 2015, DOI:10.1364/OE.23.005117 (9 pages).

(Continued)

*Primary Examiner* — Mark Hellner
(74) *Attorney, Agent, or Firm* — Foley & Lardner LLP (57) ABSTRACT

A LIDAR sensing system includes a light source that is controlled to project a collimated beam at various wavelengths. An interferometer receives the collimated beam and projects an object beam corresponding to the collimated beam at a diffraction grating. The object beam is diffracted from the diffraction grating at different angles corresponding to the wavelength of the collimated beam. As a result, the LIDAR sensing system generates a vertical scan (e.g., a two-dimensional scan) of the external environment. Various components of the LIDAR sensing system are then configured to rotate to produce multiple vertical scans, thus generating a three-dimensional scan.

20 Claims, 4 Drawing Sheets

(56) References Cited

U.S. PATENT DOCUMENTS

| | | | |
|---|---|---|---|
| 5,979,760 A | 11/1999 | Freyman et al. |
| 5,982,963 A | 11/1999 | Feng et al. |
| 6,070,093 A | 5/2000 | Oosta et al. |
| 6,111,645 A | 8/2000 | Tearney et al. |
| 6,134,003 A | 10/2000 | Tearney et al. |
| 6,160,826 A | 12/2000 | Swanson et al. |
| 6,275,718 B1 | 8/2001 | Lempert |
| 6,282,011 B1 | 8/2001 | Tearney et al. |
| 6,373,632 B1 | 4/2002 | Flanders |
| 6,421,164 B2 | 7/2002 | Tearney et al. |
| 6,485,413 B1 | 11/2002 | Boppart et al. |
| 6,501,551 B1 | 12/2002 | Tearney et al. |
| 6,556,853 B1 | 4/2003 | Cabib et al. |
| 6,564,087 B1 | 5/2003 | Pitris et al. |
| 6,725,073 B1 | 4/2004 | Motamedi et al. |
| 7,099,358 B1 | 8/2006 | Chong |
| 7,231,243 B2 | 6/2007 | Tearney et al. |
| 7,323,680 B2 | 1/2008 | Chong |
| 7,324,214 B2 | 1/2008 | De Groot et al. |
| 7,352,783 B2 | 4/2008 | Chong |
| 7,382,809 B2 | 6/2008 | Chong et al. |
| 7,388,891 B2 | 6/2008 | Uehara et al. |
| 7,400,410 B2 | 7/2008 | Baker et al. |
| 7,414,779 B2 | 8/2008 | Huber et al. |
| 7,428,057 B2 | 9/2008 | De Lega et al. |
| 7,489,713 B2 | 2/2009 | Chong et al. |
| 7,701,588 B2 | 4/2010 | Chong |
| 7,725,169 B2 | 5/2010 | Boppart et al. |
| 7,835,010 B2 | 11/2010 | Morosawa et al. |
| 7,865,231 B2 | 1/2011 | Tearney et al. |
| 7,869,057 B2 | 1/2011 | De Groot |
| 7,884,945 B2 | 2/2011 | Srinivasan et al. |
| 7,961,312 B2 | 6/2011 | Lipson et al. |
| 8,036,727 B2 | 10/2011 | Schurman et al. |
| 8,115,934 B2 | 2/2012 | Boppart et al. |
| 8,315,282 B2 | 11/2012 | Huber et al. |
| 8,405,834 B2 | 3/2013 | Srinivasan et al. |
| 8,427,649 B2 | 4/2013 | Hays |
| 8,500,279 B2 | 8/2013 | Everett et al. |
| 8,625,104 B2 | 1/2014 | Izatt et al. |
| 8,690,328 B1 | 4/2014 | Chong |
| 8,690,330 B2 | 4/2014 | Hacker et al. |
| 9,163,930 B2 | 10/2015 | Buckland et al. |
| 9,295,391 B1 | 3/2016 | Tearney et al. |
| 9,335,154 B2 | 5/2016 | Wax et al. |
| 9,851,433 B2 | 12/2017 | Sebastian |
| 2002/0163948 A1 | 11/2002 | Yoshida et al. |
| 2003/0089778 A1 | 5/2003 | Tsikos et al. |
| 2004/0036838 A1 | 2/2004 | Podoleanu et al. |
| 2005/0171438 A1 | 8/2005 | Chen et al. |
| 2005/0201432 A1 | 9/2005 | Uehara et al. |
| 2005/0213103 A1 | 9/2005 | Everett et al. |
| 2006/0105209 A1 | 5/2006 | Thyroff et al. |
| 2006/0109872 A1 | 5/2006 | Sanders |
| 2006/0215713 A1 | 9/2006 | Flanders et al. |
| 2007/0040033 A1 | 2/2007 | Rosenberg |
| 2007/0076217 A1 | 4/2007 | Baker et al. |
| 2007/0081166 A1 | 4/2007 | Brown et al. |
| 2007/0133647 A1 | 6/2007 | Daiber |
| 2007/0141418 A1 | 6/2007 | Ota et al. |
| 2007/0233396 A1 | 10/2007 | Tearney et al. |
| 2007/0263226 A1 | 11/2007 | Kurtz et al. |
| 2007/0291277 A1 | 12/2007 | Everett et al. |
| 2008/0097194 A1 | 4/2008 | Milner |
| 2008/0269575 A1 | 10/2008 | Iddan |
| 2009/0022181 A1 | 1/2009 | Atkins et al. |
| 2009/0079993 A1 | 3/2009 | Yatagai et al. |
| 2009/0103050 A1 | 4/2009 | Michaels et al. |
| 2009/0169928 A1 | 7/2009 | Nishimura et al. |
| 2009/0247853 A1 | 10/2009 | Debreczeny |
| 2009/0268020 A1 | 10/2009 | Buckland et al. |
| 2009/0290613 A1 | 11/2009 | Zheng et al. |
| 2010/0110171 A1 | 5/2010 | Satake |
| 2010/0157308 A1 | 6/2010 | Xie |
| 2010/0246612 A1 | 9/2010 | Shimizu |
| 2010/0253908 A1 | 10/2010 | Hammer et al. |
| 2010/0284021 A1 | 11/2010 | Hacker |
| 2011/0112385 A1 | 5/2011 | Aalders |
| 2011/0228218 A1 | 9/2011 | Hauger et al. |
| 2011/0235045 A1 | 9/2011 | Koerner |
| 2011/0255054 A1 | 10/2011 | Hacker et al. |
| 2011/0299034 A1 | 12/2011 | Walsh et al. |
| 2012/0013849 A1 | 1/2012 | Podoleanu et al. |
| 2012/0026466 A1 | 2/2012 | Zhou et al. |
| 2012/0133950 A1 | 5/2012 | Suehira et al. |
| 2012/0136259 A1 | 5/2012 | Milner et al. |
| 2012/0188555 A1 | 7/2012 | Izatt et al. |
| 2013/0265545 A1 | 10/2013 | Buckland et al. |
| 2014/0051952 A1 | 2/2014 | Reichgott et al. |
| 2014/0111774 A1 | 4/2014 | Komine |
| 2014/0228681 A1 | 8/2014 | Jia et al. |
| 2014/0268163 A1 | 9/2014 | Milner et al. |
| 2014/0293290 A1 | 10/2014 | Kulkarni |
| 2014/0336479 A1 | 11/2014 | Ando |
| 2015/0177380 A1* | 6/2015 | Satyan ............... G01S 17/34 356/5.09 |
| 2015/0223681 A1 | 8/2015 | Kuranov et al. |
| 2015/0348287 A1 | 12/2015 | Yi et al. |
| 2016/0178346 A1 | 6/2016 | Kulkarni |
| 2016/0259038 A1 | 9/2016 | Retterath et al. |
| 2016/0356881 A1 | 12/2016 | Retterath et al. |
| 2017/0090031 A1 | 3/2017 | Bondy et al. |
| 2018/0088236 A1 | 3/2018 | Eichenholz et al. |
| 2018/0128594 A1 | 5/2018 | Lee et al. |
| 2019/0257927 A1* | 8/2019 | Yao ............... G01S 7/4815 |
| 2020/0292673 A1 | 9/2020 | Galloway et al. |
| 2020/0292674 A1 | 9/2020 | Angus et al. |

FOREIGN PATENT DOCUMENTS

| | | |
|---|---|---|
| JP | 2008-188047 A | 8/2008 |
| JP | 2010-172538 A | 8/2010 |
| JP | 2010-540914 A | 12/2010 |
| WO | WO-2012/075126 A2 | 6/2012 |
| WO | WO-2013/168149 A1 | 11/2013 |
| WO | WO-2015/121756 A2 | 8/2015 |
| WO | WO-2017/176901 A1 | 10/2017 |
| WO | WO-2019/204301 A1 | 10/2019 |

OTHER PUBLICATIONS

Hulme, et al., "Fully integrated hybrid silicon free-space beam steering source with 32 channel phased array," Proc. of SPIE vol. 8989 898907-1, 2014 (15 pages).

Poulton, et al., "Coherent solid-state LIDAR with silicon photonic optical phased arrays," vol. 42, No. 20, Oct. 15, 2017, Optics Letters 4091 (6 pages).

Chong, et al. "Large Coherence Length Swept Source for Axial Length Measurement of the Eye," Applied Optics, 2009, pp. D145-D150, vol. 48, Issue 10.

Chopra et al., Topographical Thickness of the Skin in the Human Face, Aesthetic Surgery Journal, vol. 35(8), 2015, pp. 1007-1013.

Chowdhury, et al., "Challenges & Countermeasures in Optical Noninvasive Blood Glucose Detection," International Journal of Innovative Research in Science, Engineering and Technology, Jan. 2013, pp. 329-334, vol. 2, Issue 1.

Dai, et al., "Optical coherence tomography for whole eye segment imaging," Optics Express, Mar. 2012, pp. 6109-6115, vol. 20, Issue 6.

Dhalla, et al., "Simultaneous swept source optical coherence tomography of the anterior segment and retina using coherence revival," Optics Letters, 2012, pp. 1883-1885, vol. 37, No. 11.

Fainman, et al., "Nanophotonics for Information Systems," Information Optics and Photonics, Oct. 1, 2010, pp. 13-37, T. Fournel and B. Javidi eds., Springer New York.

Final Office Action on U.S. Appl. No. 14/723,325 dated Jul. 26, 2018.

Final Rejection Office Action on U.S. Appl. No. 14/641,200 dated Dec. 7, 2015 (13 pages).

(56) References Cited

OTHER PUBLICATIONS

Final Rejection Office Action on U.S. Appl. No. 14/723,325 dated Apr. 24, 2017 (8 pages).
International Preliminary Report on Patentability on International Application No. PCT/IB2015/000808 dated Aug. 4, 2016 (7 pages).
International Preliminary Report on Patentability on International Application No. PCT/US2015/019299 dated Sep. 13, 2016 (8 pages).
International Preliminary Report on Patentability on International Application No. PCT/US2015/032727 dated Dec. 8, 2016 (7 pages).
International Preliminary Report on Patentability on International Application No. PCT/US2016/035012 dated Dec. 14, 2017 (11 pages).
International Search Report and Written Opinion dated Aug. 26, 2015 for PCT/US15/32727 (8 pages).
International Search Report and Written Opinion on International Application No. PCT/EP2009/009189 dated Apr. 6, 2010 (12 pages).
International Search Report and Written Opinion on International Application No. PCT/IB2015/000808 dated Oct. 20, 2015 (12 pages).
International Search Report and Written Opinion on International Application No. PCT/US2015/19299 dated Nov. 2, 2015(10 pages).
International Search Report and Written Opinion on International application No. PCT/US2016/035012 dated Aug. 18, 2016 (13 pages).
Jeong, et al., "Spectral-domain OCT with dual illumination and interlaced detection for simultaneous anterior segment and retina imaging," Optics Express, Aug. 2012, pp. 19148-19159, vol. 20, Issue 17.
Jia, et al., "Split-Spectrum Amplitude-Decorrelation Angiography with Optical Coherence Tomography," Optics Express, Feb. 2012, pp. 4710-4725, vol. 20 No. 4.
Lexer, et al., "Wavelength-tuning interferometry of intraocular distances," Applied Optics, 1997, pp. 6548-6553, vol. 36, Issue 25.
Mariampillai, et al., "Speckle Variance Detection of Microvasculature Using Swept-Source Optical Coherence Tomography," Optics Letters, Jul. 2008, pp. 1530-1532, vol. 33 No. 13.
Nankivil, et al., "Handheld, rapidly switchable, anterior/posterior segment swept source optical coherence tomography probe," Biomedical Optics Express, Nov. 2015, pp. 4516-4528, vol. 6, Issue 11.
Non-Final Office Action on U.S. Appl. No. 15/086,520 dated Aug. 6, 2018.
Non-Final Office Action on U.S. Appl. No. 15/139,579 dated Jul. 17, 2018.
Non-Final Office Action on U.S. Appl. No. 15/648,239 dated Jun. 6, 2018.
Non-Final Office Action on U.S. Appl. No. 14/641,200 dated Aug. 19, 2015 (12 pages).
Non-Final Rejection Office Action on U.S. Appl. No. 13/892,997 dated Sep. 12, 2013 (15 pages).
Non-Final Rejection Office Action on U.S. Appl. No. 14/601,945 dated Mar. 2, 2016 (13 pages).
Non-Final Rejection Office Action on U.S. Appl. No. 14/613,644 dated Jun. 8, 2016 (8 pages).
Non-Final Rejection Office Action on U.S. Appl. No. 14/641,200 dated Mar. 14, 2016 (13 pages).
Non-Final Rejection Office Action on U.S. Appl. No. 14/723,325 dated Nov. 18, 2016 (8 pages).
Non-Final Rejection Office Action on U.S. Appl. No. 14/723,325 dated Dec. 7, 2017 (11 pages).
Non-Final Rejection Office Action on U.S. Appl. No. 15/202,925 dated Jul. 27, 2017 (8 pages).
Notice of Allowance on U.S. Appl. No. 13/892,997 dated Dec. 6, 2013 (9 pages).
Notice of Allowance on U.S. Appl. No. 14/601,945 dated Sep. 13, 2016 (10 pages).
Notice of Allowance on U.S. Appl. No. 14/613,644 dated Nov. 7, 2016 7 pages).
Notice of Allowance on U.S. Appl. No. 14/613,644 dated Nov. 18, 2016 (4 pages).
Notice of Allowance on U.S. Appl. No. 14/641,200 dated Jul. 12, 2016 (10 pages).
Notice of Allowance on U.S. Appl. No. 15/202,925 dated Feb. 13, 2018 (9 pages).
Ortiz, et al., "Corneal Topography From Spectral Optical Coherence Tomography (sOCT)," Biomedical Optics Express, Dec. 2011, pp. 3232-3247, vol. 2, No. 12.
Poddar, et al., "Non-Invasive Glucose Monitoring Techniques: A Review and Current Trends," Oct. 2008, pp. 1-47.
Sarlet, et al., "Wavelength and Mode Stabilization of Widely Tunable SG-DBR and SSG-DBR Lasers," IEEE Photonics Technology Letters, Nov. 1999, pp. 1351-1353, vol. 11, Issue 11.
Segawa, et al., "Semiconductor Double-Ring-Resonator-Coupled Tunable Laser for Wavelength Routing," IEEE Journal of Quantum Electronics, Jul. 2009, pp. 892-899, vol. 45, Issue 7.
Tayebati, et al., "Microelectromechanical tunable filter with stable half symmetric cavity," Electronics Letters, Oct. 1998, pp. 1967-1968, vol. 34, Issue 20.
U.S. Notice of Allowance on U.S. Appl. No. 15/202,925 dated May 17, 2018.
U.S. Office Action on U.S. Appl. No. 15/630,654 dated Apr. 4, 2018.
Pierrottet, D. et al., "Linear FMCW Laser Radar for Precision Range and Vector Velocity Measurements," MRS Proceedings, 1076-K04-06; doi:10.1557/PROC-1076-K04-06.
White et al., "In Vivo Dynamic Human Retinal Blood Flow Imaging Using Ultra-High-Speed Spectral Domain Optical Doppler Tomography," Opt. Express 11, 3490-3497 (2003).
Zhao, Y. et al., "Doppler Standard Deviation Imaging for Clinical Monitoring of In Vivo Human Skin Blood Flow," Opt. Lett. 25, 1358-1360 (2000).
Final Office Action on U.S. Appl. No. 15/139,579 dated May 15, 2019.
International Search Report and Written Opinion in PCT/US2019/027671 dated Jul. 1, 2019.
Notice of Allowance on U.S. Appl. No. 15/086,520 dated Jul. 9, 2019.
Notice of Allowance on U.S. Appl. No. 15/578,421 dated May 1, 2019.
Notice of Allowance on U.S. Appl. No. 15/611,515 dated May 21, 2019.
Notice of Allowance on U.S. Appl. No. 15/630,654 dated Apr. 22, 2019.
U.S. Office Action on U.S. Appl. No. 14/723,325 dated Apr. 19, 2019.
Zhou, et al., "Space-division multiplexing optical coherence tomography," Opt. Exp., Aug. 12, 2013, vol. 21, No. 16, pp. 19219-19227.
International Search Report and Written Opinion for International Application No. PCT/US2021/019341 dated May 3, 2021, 10 pages.

\* cited by examiner

LIDAR SENSING ARRANGEMENTS

BACKGROUND

The present invention relates generally to the field of sensing and, more specifically, to Light Detection and Ranging (LIDAR) sensing arrangements.

LIDAR systems use light for detecting a distance between a light source and a target. A collimated beam (e.g., a laser) is directed towards the target. LIDAR systems typically identify the time it takes for light to reach the target, be deflected off the target, and return to a detector. Based on this time and the speed of light, a distance to the target is determined.

SUMMARY

The present technology provides improved LIDAR systems that are capable of capturing more extensive areas of an external environment.

In one implementation of the present technology, a LIDAR sensing system is disclosed. The LIDAR sensing system includes a light source arranged to project a collimated beam along a path. The light source is configured to adjust a wavelength of the projected collimated beam. The LIDAR sensing system includes an interferometer that splits the collimated beam into 1) a reference beam and 2) an object beam that is directed into an external environment of the LIDAR sensing system. The LIDAR sensing system includes diffraction grating arranged along the path of the object beam. The light source projects the collimated beam onto the diffraction grating at an incident angle via the interferometer, and the diffraction grating diffracts the collimated beam into the external environment at one of multiple diffraction angles according to the wavelength of the collimated beam. The LIDAR sensing system includes a detector that detects interference patterns generated by the interferometer and corresponding to 1) light reflected off objects located in the external environment and 2) the reference beam. The LIDAR sensing system includes a computing system including a processing circuit. The processing circuit includes a processor and memory. The memory is structured to store instructions that, when executed by the processor, cause the processor to generate a scan along an axis of the external environment. The instructions to generate the scan along the axis of the external environment include instructions to control the light source to project the collimated beam at a first wavelength at a first time and at a second wavelength at a second time. The object beam is diffracted from the diffraction grating at a first diffraction angle when the collimated beam is projected at the first wavelength. The object beam is diffracted from the diffraction grating at a second diffraction angle when the collimated beam is projected at the second wavelength. The first diffraction angle and the second diffraction angle define a field of view along the axis. The instructions to generate the scan along the axis of the external environment include instructions to calculate distances associated with objects located within the field of view based on the interference patterns detected by the detector.

In another implementation of the present technology, a LIDAR sensing system is disclosed. The LIDAR sensing system includes a light source arranged to project a collimated beam along a path. The light source is configured to adjust a wavelength of the projected collimated beam. The LIDAR sensing system includes an interferometer that splits the collimated beam into 1) a reference beam and 2) an object beam that is directed into an external environment of the LIDAR sensing system. The LIDAR sensing system includes a detector that detects interference patterns generated by the interferometer and corresponding to 1) light reflected off objects located in the external environment and 2) the reference beam. The LIDAR sensing system includes a computing system including a processing circuit. The processing circuit includes a processor and memory. The memory is structured to store instructions that, when executed by the processor, cause the processor to generate a scan along an axis of the external environment. The instructions to generate the scan along the axis of the external environment include instructions to control the light source to sweep a wavelength of the collimated beam through a plurality of incremental wavelengths between a first wavelength and a second wavelength. The instructions to generate the scan along the axis of the external environment include instructions to calculate distances associated with objects located within the field of view based on the interference patterns detected by the detector as the light source is controlled to sweep the wavelength of the collimated beam. The distances are calculated at each incremental wavelength as the light source is swept between the first wavelength and the second wavelength.

In another implementation of the present technology, a method of LIDAR sensing is described. The method includes controlling a light source to project a collimated beam at a first wavelength at a first time and at a second wavelength at a second time. The collimated beam is projected towards diffraction grating via an interferometer that splits the collimated beam into a reference beam and an object beam. The diffraction grating diffracts the object beam into the external environment at one of multiple diffraction angles according to the wavelength of the object beam. The object beam is diffracted from the diffraction grating at a first diffraction angle when the collimated beam is projected at the first wavelength. The object beam is diffracted from the diffraction grating at a second diffraction angle when the collimated beam is projected at the second wavelength. The first diffraction angle and the second diffraction angle define a field of view along an axis. The method includes calculating distances associated with objects located within the field of view based on interference patterns generated by the interferometer and detected by a detector. The interference patterns are generated based on 1) light corresponding to the object beam being reflected off objects in the external environment and 2) the reference beam reflected off a reference mirror.

In another implementation of the present technology, a method of LIDAR sensing is described. The method includes controlling a light source to project the collimated beam at a first wavelength at a first time, wherein an object beam corresponding to the collimated beam is diffracted from diffraction grating at a first diffraction angle. The method includes performing frequency analysis on a signal from a detector and corresponding to an interference pattern to identify one or more frequency characteristics of the signal, the interference pattern being generated based on 1) light corresponding to the object beam being reflected off an object in an external environment and 2) a reference beam reflected off a reference mirror. The method includes calculating distances based on the one or more frequency characteristics of the signal. The method includes controlling the light source to project the collimated beam at a second wavelength, the object beam being diffracted from the diffraction grating at a second diffraction angle different from the first diffraction angle, whereby the first diffraction angle and the second diffraction angle define a field of view along an axis.

The foregoing summary is illustrative only and is not intended to be in any way limiting. In addition to the illustrative aspects and features described above, further aspects and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and make part of this disclosure.

Described herein are systems and methods for LIDAR sensing.

As will be discussed in further detail below, a LIDAR sensing system includes a light source that is controlled to project a collimated beam at various wavelengths. An interferometer receives the collimated beam and projects an object beam corresponding to the collimated beam at a diffraction grating. The object beam is diffracted from the diffraction grating at different angles corresponding to the wavelength of the collimated beam. As a result, the LIDAR sensing system generates a vertical scan (e.g., a two-dimensional scan) of the external environment. Various components of the LIDAR sensing system are then configured to rotate to produce multiple vertical scans, thus generating a three-dimensional scan.

Figure 1:
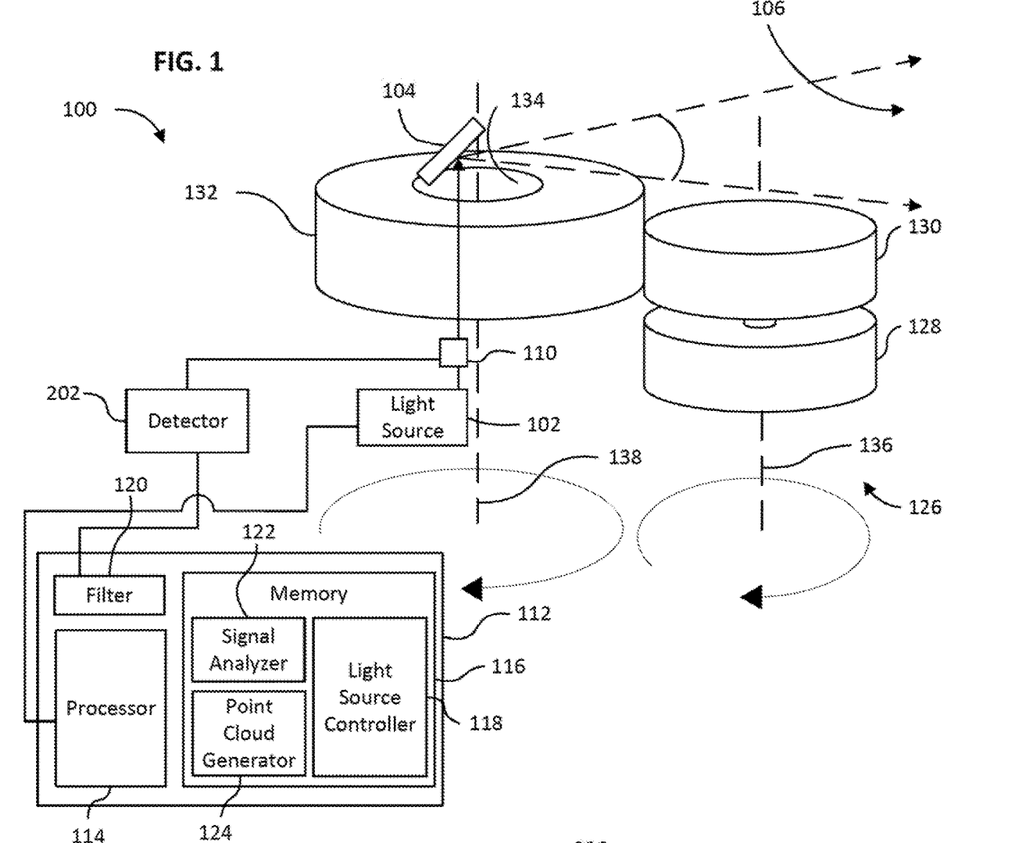
FIG. 1 depicts a LIDAR sensing system in accordance with an illustrative embodiment.

Referring to FIG. 1, a LIDAR sensing system 100 is shown. The LIDAR sensing system 100 is shown to include a light source 102. In some implementations, the light source 102 may output a collimated beam (e.g., a laser). Additionally, the light source 102 may be configured for adjustment of a wavelength $\lambda$ of the collimated beam. In this regard, the light source 102 may be a tunable laser where (at least) the wavelength $\lambda$ of the laser is tuned. The light source 102 may be configured for adjustment of the wavelength $\lambda$ of the collimated beam across a range. In some examples, the range of wavelengths $\lambda$ may be between 1.25 µm and 1.35 µm. The light source 102 may be swept across the range of wavelengths k, as will be discussed in greater detail below.

In FIG. 1, the LIDAR sensing system 100 is also shown to include diffraction grating 104. While the diffraction grating 104 is included in the LIDAR sensing system 100 of FIG. 1, in some embodiments, the LIDAR sensing system 100 may not necessarily include diffraction grating 104.

The light source 102 may be arranged to project components of the collimated beam onto the diffraction grating 104. For instance, the diffraction grating 104 may be arranged along a path of an object beam corresponding to the collimated beam projected from the light source 102. As will be discussed in greater detail below with respect to FIG. 4, the object beam may be projected onto the diffraction grating 104 at an incident angle $\alpha_0$ (see FIG. 4), and the object beam may be diffracted off the diffraction grating 104 at various diffraction angles $\beta$ corresponding to a wavelength of the collimated beam from the light source 102.

In some examples, light from the object beam reflects off a surface of an object located in an external environment 106 of the LIDAR sensing system 100. The light reflected off the surface of the object may then be detected by the LIDAR sensing system 100 and used for determining a distance to the object.

Figure 2:
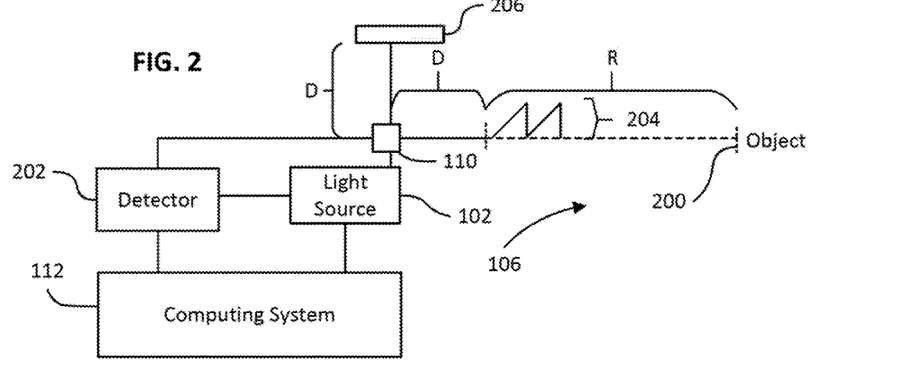
FIG. 2 depicts another LIDAR sensing system, including an object being ranged by the LIDAR sensing system, in accordance with an illustrative embodiment.

Referring now to FIG. 1 and FIG. 2, the LIDAR sensing system 100 may be used to determine a distance to an object 200 in the external environment 106. Specifically, depicted in FIG. 2 is another example of a LIDAR sensing system 100 including an example of the object 200 being ranged using the LIDAR sensing system 100. The LIDAR sensing system 100 is shown to include a detector 202. The detector 202 may be arranged to detect light reflected off the object 200. As will be discussed in greater detail below, in some implementations, the LIDAR sensing system 100 may or may not include diffraction grating 104.

The LIDAR sensing system 100 may include an interferometer 110. The interferometer 110 may be or include components arranged to receive the collimated beam from the light source 102, and split the collimated beam into one or more component beams. For instance, the interferometer 110 may split the collimated beam into an object beam and a reference beam. The object beam may be projected towards the diffraction grating 104, and the reference beam may be projected towards a reference mirror 206. The interferometer 110 may generate an interference pattern based on a difference between light reflected off surfaces of objects in the external environment 106 and light reflected off the reference mirror 206. The LIDAR sensing system 100 may determine a distance to the objects based on the interference pattern.

For instance, the object beam reflected off the object 200 may return to the diffraction grating 104, diffract from the diffraction grating 104 to the interferometer 110, and the detector 202 may detect an interference pattern from the interferometer 110. The detector 202 may generate signals based on the interference pattern. The signals from the detector 202 may be used for determining the distance to the corresponding objects located in the external environment 106.

The LIDAR sensing system 100 may include a computing system 112. The computing system 112 may include a processor 114 and memory 116. The processor 114 may include any component or group of components that are configured to execute, implement, and/or perform any of the processes or functions described herein or any form of instructions to carry out such processes or cause such processes to be performed. In one or more arrangements, the processor 114 may be a main processor of the LIDAR sensing system 100. Examples of suitable processors include microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 114 may include at least one hardware circuit (e.g., an integrated circuit) configured to carry out instructions contained in program code. In arrangements in which there is a plurality of processors, such processors may work independently from each other or one or more processors may work in combination with each other.

The memory 116 may be structured for storing one or more types of data. The memory 116 store may include volatile and/or non-volatile memory. Examples of suitable memory 116 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 116 may be a component of the processor 114, or the memory 116 may be operatively connected to the processor 114 for use thereby. In some arrangements, the memory 116 may be located remotely and accessible by the processor 114, such as via a suitable communications device.

The LIDAR sensing system 100 may include a light source controller 118. The light source controller 118 may be or include computer-readable instructions to control one or more aspects of the light source 102. The light source controller 118 may be stored on memory 116 as shown. In other implementations, the light source controller 118 may be stored remotely and accessible by various components of the LIDAR sensing system 100. The processor 114 may control the light source 102 in accordance with the instructions from the light source controller 118.

The light source controller 118 may include instructions to generate a pattern for the collimated beam projected from the light source 102. For instance, in some implementations, the collimated beam may be projected from the light source 102 in a pattern 204 having a frequency (e.g., pulsed, saw tooth, etc.). The light source controller 118 may include instructions to generate, for example, a saw tooth signal 204 that corresponds to the frequency pattern of the collimated beam projected from the light source 102. As will be discussed in further detail below, the frequency pattern may be used for determining a distance between the object and the LIDAR sensing system 100.

Figure 3:
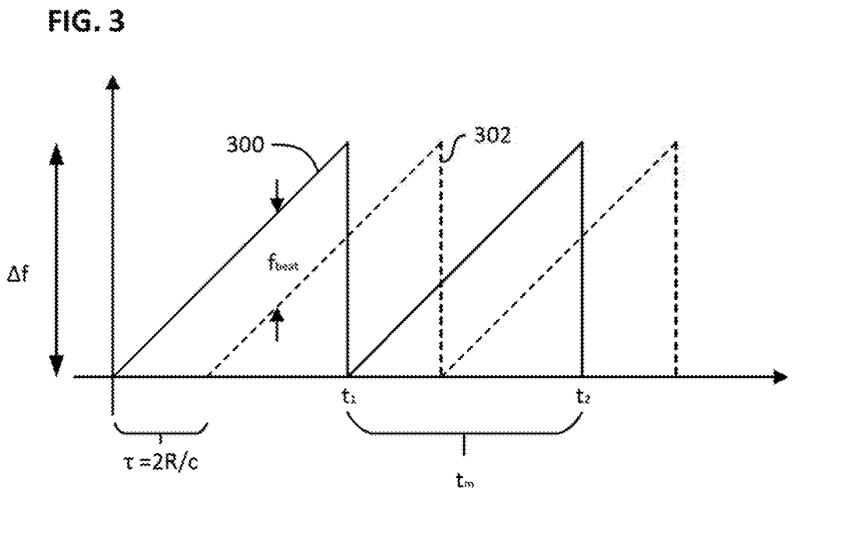
FIG. 3 depicts an example signal profile of the example object ranged in FIG. 2 in accordance with an illustrative embodiment.

Referring now to FIG. 2 and FIG. 3, an example of the object 200 being ranged using the LIDAR sensing system 100 and corresponding signal profile are respectively shown. It should be understood that, while described with reference to FIG. 2 and FIG. 3, the same description may apply to FIG. 1. In the example LIDAR sensing system 100 shown in FIG. 2, the LIDAR sensing system 100 does not include diffraction grating 104. In embodiments such as those shown in FIG. 2, the arrangements described herein can sweep the frequency of the collimated beam, and calculate as the frequency is incrementally changed for the collimated beam.

The signal generated by the detector 202 may correspond to the signal generated by the light source controller 118 and projected via the light source 102 onto the object 102. In some implementations, the light source 102 may be arranged to project the collimated beam both onto the object 200 and the reference mirror 206 (e.g., through the interferometer 110). The reference mirror 206 may be located at a fixed distance D from a point (e.g., from the interferometer 110, for example). The object 200 may be located a distance away that is equal to the sum of the fixed distance D and the range R to the object 200.

When light from the light source 102 is projected in a pattern (e.g., the saw tooth pattern 204 shown in FIG. 2, for example), the interferometer 110 may generate an interference pattern that corresponds to the reference beam reflected off the reference mirror 206 (e.g., reference signal 300) and light which is reflected off the surface of the object 200 (e.g., object signal 302). The detector 202 may detect the interference pattern generated by interferometer 110 and generate signals corresponding to the interference patterns. In some implementations, the signals generated by the detector 202 may be filtered (e.g., by filter 120). Following the signals being generated by the detector 202 (and optional filtering by filter 120), the frequency of the signals may be identified.

Referring now to FIGS. 1-3, in some implementations, the computing system 112 may include a signal analyzer 122. The signal analyzer 122 may be or include instructions to process signals from the detector 202 (following optional filtering by the filter 120) to identify a frequency $f$ of the signals. As one example, the signal analyzer 122 can be or include a frequency counter to calculate, identify, quantify, or otherwise determine a frequency associated with the signals corresponding to the interference patterns. As another example, the signal analyzer 122 may include computer-readable instructions to perform frequency analysis (e.g., fast Fourier analysis) of the interference pattern to identify frequencies of the signals. The signal analyzer 122 may include instructions to identify a range of frequencies $\Delta f$ for each of the respective signals. The signal analyzer 122 may include instructions to identify a time shift $\tau$ between the reference signal 300 and object signal 302. The signal analyzer 122 may include instructions to identify the ramp period $t_m$ for the reference signal 300 and/or object signal 302. The signal analyzer 122 may include instructions to identify a beat frequency $f_{beat}$ at various points in time between the reference signal 300 and object signal 302. Each (or a subset) of these frequency or other characteristics of the respective signals may be used for determining a distance R to the object 200.

The reference signal 300 and object signal 302 are shown in FIG. 3. The reference signal 300 is detected sooner than the object signal 302, as the object 200 is located at a distance (e.g. R) further than the reference mirror 206. The LIDAR sensing system 100 may determine the distance between the object and the point within the LIDAR sensing system 100 based on the comparison of the reference signal 300 and the object signal 302. The LIDAR sensing system 100 may determine the distance according to equation (1):

$$R = \frac{cf_{beat}}{2\left(\frac{\Delta f}{t_m}\right)} \tag{1}$$

where c is the speed of light, $f_{beat}$ is the beat frequency, $\Delta f$ is the range of frequencies, and $t_m$ is the ramp period (e.g., the time between $t_1$ and $t_2$). Where the fixed distance D between the reference mirror 206 and a point in the LIDAR sensing system 100 (e.g., interferometer 110) is known, the distance between the object and the same point is the sum of the fixed distance D and R (as shown in FIG. 2). Accordingly, the distance between a single point on a surface of an object (e.g., object 200) and a point within the LIDAR sensing system 100 may be determined based on the interference pattern corresponding to the reference signal 300 and object signal 302.

In some implementations, the LIDAR sensing system 100 may calculate the distance instantaneously (or substantially instantaneously). In implementations such as these, the LIDAR sensing system 100 may calculate the distance according to equation (2):

$$R = \frac{cf_{beat}}{2\left(\frac{df}{dt_m}\right)} \tag{2}$$

where $$\frac{df}{dt_m}$$

is the instantaneous slope of the frequency ramp, and $dt_m$ is the ramp increment. Implementation such as these can compensate for any nonlinearity of frequency ramp of tunable light source 102, which may increase reliability of the distance calculations.

In some implementations, the LIDAR sensing system 100 may include the interferometer 110 (e.g., a main interferometer) and an auxiliary interferometer. The auxiliary interferometer may be substantially the same as the main interferometer. Additionally, the LIDAR sensing system 100 may include the detector 202 (e.g., a main detector) and an auxiliary detector. The auxiliary detector may be substantially the same as the main detector. The auxiliary interferometer may be arranged to receive the collimated beam from the light source 102. The auxiliary interferometer may split the collimated beam from the light source 102 into two beams, each of which is located at a fixed path length (e.g., a fixed range or distance from the auxiliary interferometer). The auxiliary detector may detect interference patterns from the auxiliary interferometer. In implementations such as these, the interferometer 110 may generate the same interference patterns described above, and the auxiliary interferometer may generate interference patterns corresponding to the fixed path length. The signal analyzer 122 can include instructions for analyzing signals from both the detector 202 and auxiliary detector. The signal analyzer 122 can calculate distances according to equation (3):

$$R = R_o \frac{f_{beat}}{f_{refbeat}} \tag{3}$$

where $R_o$ is the fixed path length associated with the auxiliary interferometer, $f_{ref\,beat}$ is the beat frequency from the auxiliary interferometer, and $f_{beat}$ is the beat frequency from the main interferometer (described above). In implementations such as these, the LIDAR sensing system 100 may compensate for any nonlinearity of the light source 102, which may increase accuracy of the distance calculations.

In each of these implementations described above, distances may be calculated on a "rolling" basis as the wavelength of the light source 102 is swept across a range. Further, various arrangements and calculations described above may further increase accuracy of the distance calculations (e.g., through different mathematical calculations, additional interferometers, etc.).

In some embodiments, the LIDAR sensing system 100 may calculate distances at each interval as the wavelength (and therefore frequency) is changed. In these embodiments, the wavelength (and frequency) can be incrementally changed. For instance, the range of wavelengths can be subdivided into a number of increments. At each incremental wavelength, the distance can be calculated (e.g., according to any of the implementations described above, according to time shift or a time difference between receiving an indication of detection of the object beam and reference beam, etc.).

The computing system 112 may include a point cloud generator 124. The point cloud generator 124 may be or include instructions to generate a point cloud from various distance measurements. Point cloud, as used herein, refers to a two or three dimensional representation of an external environment 106 of the LIDAR sensing system 100 based on measured distances to various surfaces detected in the external environment 106. The point cloud generator 124 may include instructions to store each calculated distance and, for instance, an associated coordinate in a coordinate system. Additionally, where the object beam is moved (e.g., mechanically or electromechanically), further distance measurements may be obtained and thereby producing a two-dimensional scan or three-dimensional scan of the external environment 106. At least some of these measurements may be used for forming the point cloud. In some implementations, such as those where at least some components of the LIDAR sensing system 100 are rotated a number of degrees about an axis (e.g., axis 138 of FIG. 1, axis 602 of FIG. 6, etc.), the point cloud may be a 3D point cloud. For instance, where at least some of the components of the LIDAR sensing system 100 are rotated 360° about an axis, the point cloud generator 124 may generate a 360° point cloud. Each of the measured distances and their associated coordinates may be used for forming the point cloud.

Figure 4:
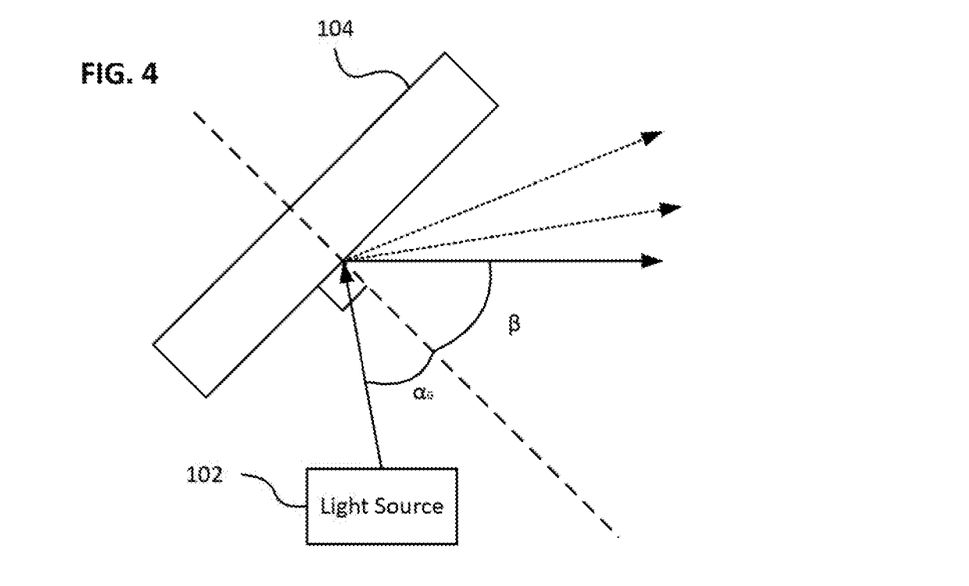
FIG. 4 depicts a detailed view of diffraction grating in the LIDAR sensing system of FIG. 1 in accordance with an illustrative embodiment.

Referring now to FIG. 1 and FIG. 4, the collimated beam projected from the light source 102 may have a wavelength that is swept across a range to change a diffraction angle β. While described as "swept" herein, it should be understood that the wavelength can be continuously swept, swept at intervals or increments, etc. As shown, light from the light source 102 may be projected onto the diffraction grating 104 (through interferometer 110) at an incident angle $\alpha_0$. In some implementations, the incident angle $\alpha_0$ may be fixed. Accordingly, the relationship between the interferometer 110 and the diffraction grating 104 may be maintained throughout various scans, as will be discussed in greater detail below.

The collimated beam may be projected from the light source 102 at a variable wavelength. For instance, the light source controller 118 may include instructions for changing the wavelength of the collimated beam from the light source 102. As stated above, in some examples, the range of wavelengths λ at which the collimated beam from the light source 102 may be swept may be between 1.25 μm and 1.35 μm. As the wavelength λ of the collimated beam projected from the light source 102 is swept, the diffraction angle β changes. The diffraction angle β changes according to equation (4) below:

$$\lambda = d(\sin \alpha_0 - \sin \beta) \quad (4)$$

where the groove frequency d of grating in the diffraction grating 104 is 1200/mm (as one non-limiting example). According to equation (4), as the wavelength A increases, the diffraction angle β increases. Continuing the previous example, where the wavelength λ is swept from 1.25 μm and 1.35 μm, the diffraction angle β changes from 61.3 degrees to 85.9 degrees, or a 24.6 degree field of view along the vertical axis.

In some implementations, the collimated beam projected from the light source 102 may have a linewidth of 1 MHz. In implementations such as these, the coherence length may be 300 m (or a single path range of 150 m). Additionally, the collimated beam projected from the light source 102 may have a tuning range of 1.6 GHz. In these implementations, the resolution may be 9 cm. In each of these implementations, the LIDAR sensing system 100 may satisfy, at least, current standard requirements for LIDAR in many autonomous driving applications (e.g., ranging of 100 m and a resolution of less than 10 cm).

Figure 5:
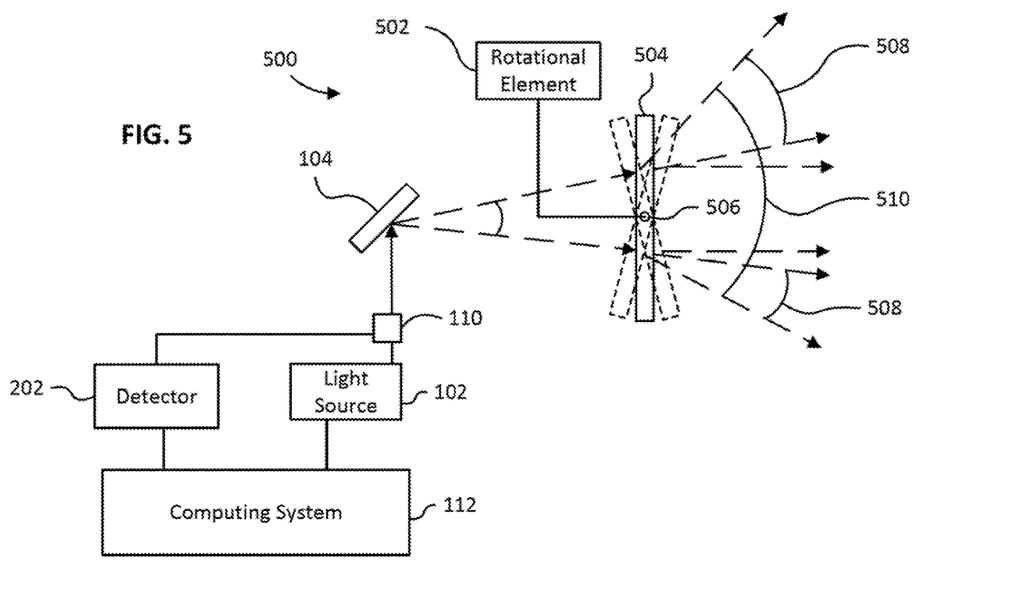
FIG. 5 depicts the LIDAR sensing system of FIG. 1 including a field of view (FOV) expansion system in accordance with an illustrative embodiment.

Referring now to FIG. 5, in some implementations, the LIDAR sensing system 100 may further include components to increase the field of view along an axis. For example, the LIDAR sensing system may include a field of view (FOV) expansion system 500. The FOV expansion system 500 may include a rotational element 502 and a mirror 504. The rotational element 502 may be operatively connected to mirror 504. For instance, the rotational element 502 may be operatively connected to a swivel 506 for the mirror 504. In some implementations, the rotational element 502 may be a micro-electromechanical system (MEMS) driver. In implementations such as these, the diffraction grating 104 may be arranged to diffract the object beam towards the mirror 504. The rotational element 502 may then rotate the mirror 504 to further expand the field of view of the LIDAR sensing system 100 along the axis.

In some embodiments, the rotational element 502 may rotate the mirror 504 a number of degrees along the vertical axis. In so doing, the object beam diffracted from the diffraction grating 104 may be reflected off the mirror 504 at an angular range 508 corresponding to the rotation of the mirror 504. As a result, the field of view 510 of the LIDAR sensing system 100 may be defined by the degree of rotation of the mirror 504 and the change in wavelength of the collimated beam from the light source 102.

As the wavelength of the collimated beam is swept across the range, the LIDAR sensing system 100 may acquire data corresponding to various distances to objects in the external environment 106 (e.g., along the axis). In this regard, the LIDAR sensing system 100 may execute a scan (e.g., a two-dimensional scan) of the external environment 106 along an axis (e.g., the vertical axis of the external environment 106). As will be discussed in greater detail below, where various components of the LIDAR sensing system 100 are rotated, the LIDAR sensing system 100 may generate additional vertical scans. These additional vertical scans may be combined to generate a three-dimensional scan of the external environment 106 (e.g., via the point cloud generator 124). Such a three-dimensional scan may have several practical applications including, but not limited to, object detection and tracking, advanced driving assistance systems, autonomous driving, etc. Additionally, such a three-dimensional scan may be used in other fields outside of vehicle applications including, for instance, generation of three-dimensional maps.

Figure 6:
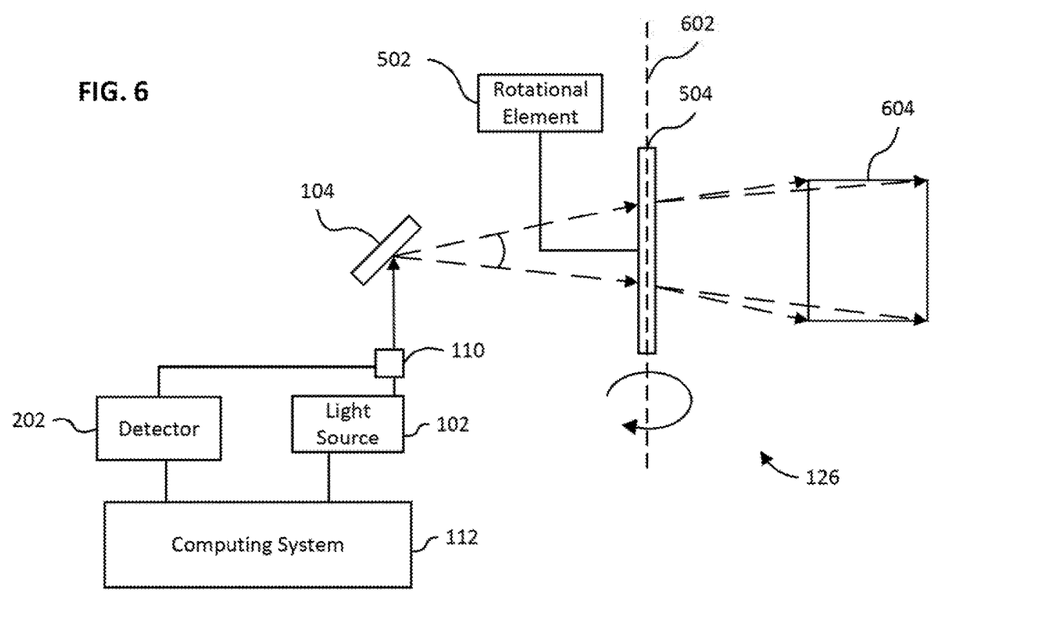
FIG. 6 depicts the LIDAR sensing system of FIG. 1 including an example rotational system in accordance with an illustrative embodiment.

Referring now to FIG. 1 and FIG. 6, according to some embodiments, the LIDAR sensing system 100 may include a rotational system 126. The rotational system 126 may be or include any component or group of components configured to rotate one or more elements of the LIDAR sensing system 100. The rotational system 126 may be used for generating a three-dimensional data and a resulting three-dimensional point cloud of the external environment 106.

As shown in FIG. 1, in some implementations, the rotational system 126 may include a motor 128, one or more rotational drivers 130, and one or more rotary stages 132. In some implementations, the motor 128 may be a DC motor. The motor 128 may be connected to (e.g., via a shaft) the rotational driver 130. The motor 128 may be configured to rotate the rotational driver 130. The rotational driver 130 may be or include one or more gears, pulleys, and/or other components configured to be rotated by the motor 128 and, as a result, rotate the rotary stage 132. The rotary stage 132 may be configured to support (and thereby rotate) one or more elements of the LIDAR sensing system 100. For instance, the rotary stage 132 may support the diffraction grating 104, the FOV expansion system 500 (where included), etc., which may be mounted thereto. In some implementations, the rotary stage 132 may include an aperture 134 to allow the object beam to pass through the rotary stage 132 and onto the diffraction grating 104.

The motor 128 may be configured to rotate about an axis 136 as shown. When the motor 128 rotates about the axis 136, the motor 128 may rotate the rotational driver 130 about another axis. In the example shown, the motor 128 causes the rotational driver 130 to rotate about the same axis 136. However, the motor 128 may cause the rotational driver 130 to rotate along an axis that is different from axis 136. Accordingly, the present disclosure is not limited to the particular arrangement shown in FIG. 1.

When the rotational driver 130 rotates about an axis (for instance, axis 136), the rotational driver 130 may cause the rotary stage 132 to rotate about another axis 138. In some implementations, the rotational driver 130 may cause the rotary stage 132 to rotate a full 360° about the axis 138. In other implementations, the rotation driver 130 may cause the rotary stage 132 to rotate less than (or greater than) the full 360° about the axis 138. As the rotary stage 132 rotates about axis 138, LIDAR sensing system 100 may generate additional scans along the vertical axis (e.g., through controlling the light source 102). Each of these scans may generate distance data associated with various objects located along the vertical axis. The point cloud generator 124 may include instructions to generate a three-dimensional point cloud based on each of these vertical scans.

As shown in FIG. 6, in some implementations, the rotational system 126 may include a rotational element 502 and mirror 504. The rotational element 502 and mirror 504 may be similar to those described above with reference to FIG. 5.

In some implementations, the LIDAR sensing system 100 may include both the FOV expansion system 500 and rotational system 126, in which case the LIDAR sensing system 100 includes two rotational elements 502 and two mirrors 504.

Where the rotational system 126 includes the rotational element 502 and mirror 504, the rotational element 502 may be arranged to rotate the mirror 504 about axis 602 (e.g., an axis 602 parallel to the vertical axis). The mirror 504 may be rotated about the axis 602, and subsequent vertical scans may be generated of the external environment 106 (e.g., shown by box 604). Each of these vertical scans may be used to generate a point cloud, as described above.

Figure 7:
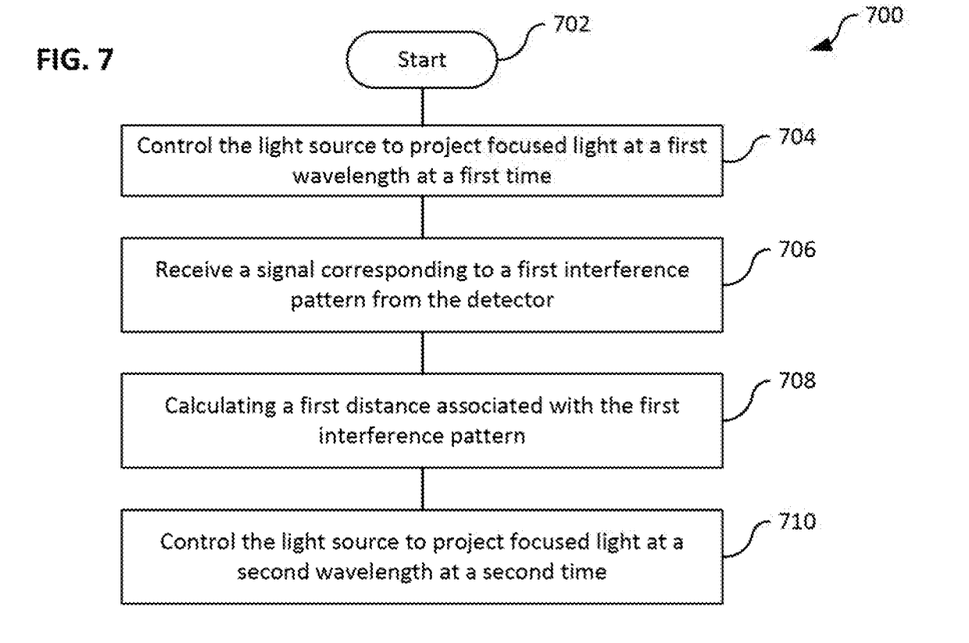
FIG. 7 depicts a flow chart showing an example method of LIDAR sensing in accordance with an illustrative embodiment.

Now that various aspects of the disclosed systems and components have been described, a method of LIDAR scanning will be described with reference to FIG. 7. The flow chart shown in FIG. 7 provides only one example of LIDAR scanning. Accordingly, the following disclosure should not be limited to each and every function block shown in FIG. 7. To the contrary, the method does not require each and every function block shown in FIG. 7. In some examples, the method may include additional function blocks. Further, the method does not need to be performed in the same chronological order shown in FIG. 7.

Referring now to FIG. 7, a flow chart is shown to depict an example method 700 of LIDAR scanning is shown.

At operation 702, the method 700 may begin. For example, the method 700 may begin when an initialization signal (e.g., from a user) is received by the various components/systems described herein. As another example, the method 700 may begin when a vehicle is started (e.g., when the LIDAR sensing system 100 is a component of the vehicle). The method 700 may proceed to operation 704.

At operation 704, the method 700 may include controlling the light source 102 to project the collimated beam at a first wavelength at a first time. The collimated beam may be split by interferometer 110 into the object beam and reference beam. The object beam may be projected onto the diffraction grating 104. In some implementations, the processor 114 may control the light source 102 in accordance with the instructions from the light source controller 118. The object beam may be diffracted from the diffraction grating 104 at a first diffraction angle β. The object beam may be diffracted from the diffraction grating 104 at the first diffraction angle β in accordance with the wavelength of the collimated beam. The method 700 may proceed to operation 706.

In some implementations, while the light source 102 projects the collimated beam at the first wavelength, the method 700 may further include generating one or more control signals FOV expansion system 500 to control the rotational element 502 to rotate the mirror 504 in a first direction. In implementations such as these, the collimated beam may be reflected off the mirror 504 into the external environment 106 at a first angular range 508 corresponding to a degree of rotation of the mirror 504. In implementations where the mirror 504 is rotated in the first direction, the field of view for the LIDAR sensing system 100 may be defined by the first and second diffraction angle and the first angular range 508.

At operation 706, the method 700 may include receiving a signal corresponding to a first interference pattern from the detector 202. The interferometer 110 may generate the first interference pattern based on light reflected off objects in the external environment 106 and the reference mirror 206. The detector 202 may detect the interference pattern, and may generate a signal corresponding to the interference pattern. The first interference pattern may be associated with the collimated beam projected at operation 704. The method 700 may proceed to operation 708.

At operation 708, the method 700 may include calculating a first distance associated with the first interference pattern from operation 706. The signal analyzer 122 can include instructions for calculating the first distance (e.g., via any of equations 1-3). The signal analyzer 122 can include instructions for analyzing the signal from function block 706 to determine various signal characteristics (e.g., frequency, temporal, or other characteristics). The signal analyzer 122 can include instructions for calculating the first distance based on various characteristics of the analyzed signal. The method 700 may proceed to operation 710.

At operation 710, the method 700 may include controlling the light source 102 to project the collimated beam at a second wavelength at a second time. Operation 710 may be similar to operation 704. However, the second wavelength may be different from the first wavelength. Accordingly, the object beam may be diffracted from the diffraction grating 104 at a second diffraction angle β different from the first diffraction angle β. The object beam may be diffracted from the diffraction grating 104 at the second diffraction angle β in accordance with the wavelength of the collimated beam.

The method 700 may include calculating additional distances in substantially the same manner as described above with reference to operation 708. In this regard, the method 700 may include calculating distances associated with various objects located along the axis in the external environment 106. The distances may be calculated based on interference patterns generated by the interferometer 110 and detected by the detector 202. The distances may be calculated on a "rolling" basis. For instance, as the light source 102 is controlled to sweep the collimated beam across a range of wavelengths, the method 700 may include calculating distances as the collimated beam is swept across the range of wavelengths.

In some implementations, while the light source 102 projects the collimated beam at the second wavelength, the method 700 may further include generating one or more control signals for the FOV expansion system 500 to control the rotational element 502 to rotate the mirror 504 in a second direction. In implementations such as these, the object beam may be reflected off the mirror 504 into the external environment 106 at a second angular range 508 corresponding to a degree of rotation of the mirror 504. In implementations where the mirror 504 is rotated in the second direction, the field of view for the LIDAR sensing system 100 may be defined by the first and second diffraction angle and the second angular range 508. Additionally, where the mirror 504 is rotated in both the first direction while the light source 102 projects the collimated beam at the first wavelength the second direction while the light source 102 projects the collimated beam at the second wavelength, the field of view for the LIDAR sensing system 100 may be defined by the first and second diffraction angle and the first and second angular range 508.

In some implementations, following execution of the operations 702 through 710 to generate a first scan along an axis (e.g., a vertical axis) at a first position, the method 700 may further include generating one or more control signals for the rotational system 126 to one or more components of the LIDAR sensing system 100 about another axis to a second position. In implementations such as these, the method 700 may further include generating a second scan (and additional scans) of adjacent portions of the external environment 106 (e.g., through executing operations 702 through 710 when the rotary stage 132 is located at the second position).

In some implementations, the method 700 may include generating a point cloud map based on distances (including the first distance calculated at operation 708). The point cloud map may be a 360° point cloud map. For instance, the point cloud map may be a 360° point cloud map when the rotary stage is rotated 360° about the second axis.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments.

While certain embodiments have been illustrated and described, it should be understood that changes and modifications may be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations may be made without departing from its spirit and scope, as will be apparent to those skilled in the art. Functionally equivalent methods and compositions within the scope of the disclosure, in addition to those enumerated herein, will be apparent to those skilled in the art from the foregoing descriptions.

Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which may of course vary.

It is also to be understood that the terminology used herein is for the purpose of describing particular embodiments only, and is not intended to be limiting.

As will be understood by one skilled in the art, for any and all purposes, particularly in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like, include the number recited and refer to ranges which may be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety.

Definitions that are contained in text incorporated by reference are excluded to the extent that they contradict definitions in this disclosure.

Other embodiments are set forth in the following claims.

What is claimed is:

1. A LIDAR sensing system, comprising:
   a light source arranged to project a collimated beam along a path, the light source configured to adjust a wavelength of the projected collimated beam;
   an interferometer that splits the collimated beam into 1) a reference beam and 2) an object beam that is directed into an external environment of the LIDAR sensing system;
   diffraction grating arranged along the path of the object beam, the light source projecting the object beam onto the diffraction grating at an incident angle via the interferometer, and the diffraction grating diffracting the object beam into the external environment at one of multiple diffraction angles according to the wavelength of the collimated beam;
   a detector that detects interference patterns generated by the interferometer and corresponding to 1) light reflected off objects located in the external environment and 2) the reference beam; and
   a computing system including a processing circuit, the processing circuit including a processor and memory, the memory being structured to store instructions that, when executed by the processor, cause the processor to generate a scan along an axis of the external environment by executing instructions to:
      control the light source to project the collimated beam at a first wavelength at a first time and at a second wavelength at a second time, the object beam being diffracted from the diffraction grating at a first diffraction angle when the collimated beam is projected at the first wavelength and the object beam being diffracted from the diffraction grating at a second diffraction angle when the collimated beam is projected at the second wavelength, wherein the first diffraction angle and the second diffraction angle define a field of view along the axis; and
      calculate distances associated with objects located within the field of view based on the interference patterns detected by the detector.

2. The LIDAR sensing system of claim 1, wherein the memory is structured to store instructions that cause the processor to generate the scan along the axis of the external environment by executing instructions to:
   control the light source to sweep wavelengths for the collimated beam between the first wavelength and the second wavelength, whereby the processor calculates the distances as the object beam is swept across the field of view.

3. The LIDAR sensing system of claim 1, further comprising:

a rotational system for generating additional scans of the external environment.

4. The LIDAR sensing system of claim 3, wherein the rotational system comprises:
a motor operatively connected to the computing system;
a rotational driver operatively connected to and being rotated by the motor; and
a rotary stage operatively connected to and being rotated by the rotational driver, wherein the diffraction grating is mounted to and rotating with the rotary stage about a second axis perpendicular to the axis,
wherein the scan along the axis of the external environment is a first scan, and wherein the memory further stores instructions that, when executed by the processor, cause the processor to generate a second scan of an adjacent portion of the external environment by executing instructions to:
following the first scan along the axis at a first position, generate one or more control signals for the motor to rotate the rotary stage about the second axis to a second position and, when the rotary stage is located at the second position, generate the second scan of the adjacent portion of the external environment.

5. The LIDAR sensing system of claim 3, wherein the rotational system comprises:
a mirror arranged along the path of the object beam beyond the diffraction grating;
a rotational element operatively connected to and configured to rotate the mirror,
wherein the scan along the axis of the external environment is a first scan, and wherein the memory further stores instructions that, when executed by the processor, cause the processor to generate a second scan of an adjacent portion of the external environment by executing instructions to:
following the first scan along the axis at a first position, generate one or more control signals for the rotational element to rotate the mirror to a second position; and
when the mirror is located at the second position, generate the second scan of the adjacent portion of the external environment.

6. The LIDAR sensing system of claim 1, further comprising a field of view (FOV) expansion system for expanding the field of view along the axis, the FOV expansion system comprising:
a mirror arranged along the path of the object beam beyond the diffraction grating;
a rotational element operatively connected to and configured to rotate the mirror, wherein the processor generates the scan of the external environment along the axis by executing instructions to:
while the light source projects the collimated beam at the first wavelength, generate one or more control signals for the rotational element to rotate the mirror in a first direction, the object beam being reflected off the mirror and into the external environment at a first angular range corresponding to a degree of rotation of the mirror in the first direction; and
while the light source projects the collimated beam at the second wavelength, generate one or more additional control signals for the rotational element to rotate the mirror in a second direction, the object beam being reflected off the mirror and into the external environment at a second angular range corresponding to a degree of rotation of the mirror in the second direction.

7. The LIDAR sensing system of claim 1, further comprising:
a frequency counter arranged to determine a frequency associated with the generated interference patterns, and wherein the memory further stores instructions to:
identify, based on the frequency associated with the interference patterns, a beat frequency, a range of frequencies associated with the interference pattern, and a ramp period; and
calculate distances based on the beat frequency, the range of frequencies, and the ramp period.

8. The LIDAR sensing system of claim 1, wherein the distances are calculated according to:

$$R = \frac{cf_{beat}}{2\left(\frac{\Delta f}{t_m}\right)}$$

where c is the speed of light, $f_{beat}$ is a beat frequency, $\Delta f$ is a range of frequencies, and $t_m$ is a ramp period.

9. The LIDAR sensing system of claim 1, wherein the distances are calculated according to:

$$R = \frac{cf_{beat}}{2\left(\frac{df}{dt_m}\right)}$$

where c is the speed of light, $f_{beat}$ is a beat frequency, $$\frac{df}{dt_m}$$

is an instantaneous slope or a frequency ramp, and $dt_m$ is a ramp increment.

10. The LIDAR sensing system of claim 1, wherein the interferometer is a main interferometer and the detector is a main detector, and wherein the LIDAR sensing system further comprises:
an auxiliary interferometer with a fixed path length; and
an auxiliary detector detecting an interference signal of the auxiliary interferometer, wherein the distances are calculated according to:

$$R = Ro \frac{f_{beat}}{f_{refbeat}}$$

where Ro is the fixed path length of the auxiliary interferometer and $f_{refbeat}$ is a beat frequency of auxiliary interferometer, $f_{beat}$ is a beat frequency caused by the main interferometer.

11. A LIDAR sensing system, comprising:
a light source arranged to project a collimated beam along a path, the light source configured to adjust a wavelength of the projected collimated beam;
an interferometer that splits the collimated beam into 1) a reference beam and 2) an object beam that is directed into an external environment of the LIDAR sensing system;
a detector that detects interference patterns generated by the interferometer and corresponding to 1) light reflected off objects located in the external environment and 2) the reference beam; and a computing system including a processing circuit, the processing circuit including a processor and memory, the memory being structured to store instructions that, when executed by the processor, cause the processor to generate a scan along an axis of the external environment by executing instructions to:

control the light source to sweep a wavelength of the collimated beam through a plurality of incremental wavelengths between a first wavelength and a second wavelength; and as the light source is controlled to sweep the wavelength of the collimated beam, calculate distances associated with objects located within the field of view based on the interference patterns detected by the detector, wherein the distances are calculated at each incremental wavelength as the light source is swept between the first wavelength and the second wavelength.

12. A method of LIDAR sensing, the method comprising:
controlling a light source to project a collimated beam at a first wavelength at a first time and at a second wavelength at a second time, the collimated beam being projected towards diffraction grating via an interferometer that splits the collimated beam into a reference beam and an object beam, the diffraction grating diffracting the object beam into the external environment at one of multiple diffraction angles according to the wavelength of the collimated beam, wherein the object beam is diffracted from the diffraction grating at a first diffraction angle when the collimated beam is projected at the first wavelength and the object beam is diffracted from the diffraction grating at a second diffraction angle when the collimated beam is projected at the second wavelength, wherein the first diffraction angle and the second diffraction angle define a field of view along an axis; and calculating distances associated with objects located within the field of view based on interference patterns generated by the interferometer and detected by a detector, the interference patterns being generated based on 1) light corresponding to the object beam being reflected off objects in the external environment and 2) the reference beam reflected off a reference mirror.

13. The method of claim 12, further comprising:
controlling a rotational system to generate additional scans of the external environment.

14. The method of claim 13, wherein the rotational system comprises:
a motor;
a rotational driver operatively connected to and being rotated by the motor; and
a rotary stage operatively connected to and being rotated by the rotational driver, wherein the light source, the diffraction grating, and the detector are connected to and rotating with the rotary stage about a second axis perpendicular to the axis, and
wherein controlling the rotational system to generate the additional scans of the external environment comprises:
following a first scan along the axis at a first position, generate one or more control signals for the motor to rotate the rotary stage about the second axis to a second position and, when the rotary stage is located at the second position, generate a second scan of an adjacent portion of the external environment.

15. The method of claim 13, wherein the rotational system comprises:
a mirror arranged along the path of the object beam beyond the diffraction grating;
a rotational element operatively connected to and configured to rotate the mirror, and
wherein the rotational system to generate the additional scans of the external environment comprises:
following a first scan along the axis at a first position, generate one or more control signals for the rotational element to rotate the mirror to a second position; and
when the mirror is located at the second position, generate a second scan of an adjacent portion of the external environment.

16. The method of claim 12, further comprising:
controlling a field of view (FOV) expansion system to expand the field of view along the axis, wherein controlling the FOV expansion system comprises:
while the light source projects the collimated beam at the first wavelength, generate one or more control signals for a rotational element to rotate a mirror in a first direction, the object beam being reflected off the mirror and into the external environment at a first angular range corresponding to a degree of rotation of the lens in the first direction; and
while the light source projects the collimated beam at the second wavelength, generate one or more additional control signals for the rotational element to rotate the mirror in a second direction, the object beam being reflected off the mirror and into the external environment at a second angular range corresponding to a degree of rotation of the lens in the second direction.

17. The method of claim 16, wherein the field of view along the axis is defined by the first angular range, the second angular range, the first diffraction angle, and the second diffraction angle.

18. The method of claim 12, wherein calculating the distances further comprises:
determining, using a signal analyzer, a beat frequency associated with a respective interference pattern, a range of frequencies associated with the respective interference pattern, and a ramp period; and
calculating a distance corresponding to the respective interference pattern based on the beat frequency, the range of frequencies, and the ramp period.

19. The method of claim 12, wherein the distances are calculated according to:

$$R = \frac{cf_{beat}}{2\left(\frac{\Delta f}{t_m}\right)}$$

where c is the speed of light, $f_{beat}$ is a beat frequency, $\Delta f$ is a range of frequencies, and $t_m$ is a ramp period.

20. The method of claim 13, wherein the interferometer is a main interferometer, and wherein further comprising of an additional auxiliary interferometer with a fixed path length, and a detector detecting interference signal of the auxiliary interferometer, where distances are calculated according to:

$$R = Ro \frac{f_{beat}}{f_{refbeat}}$$

where Ro is the fixed path length of an auxiliary interferometer and $f_{refbeat}$ is a beat frequency from the auxiliary interferometer, and $f_{beat}$ is a beat frequency from the main interferometer.

* * * * *